(12) United States Patent
Siddiqui et al.

(10) Patent No.: US 8,722,569 B2
(45) Date of Patent: *May 13, 2014

(54) PEROXIDE DECOMPOSITION CATALYST PARTICLES

(75) Inventors: Junaid Ahmed Siddiqui, Richmond, VA (US); Kimberly Gheysen Raiford, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 340 days.

This patent is subject to a terminal disclaimer.

(21) Appl. No.: 11/712,026

(22) Filed: Feb. 28, 2007

(65) Prior Publication Data

US 2007/0213209 A1    Sep. 13, 2007

Related U.S. Application Data

(60) Provisional application No. 60/782,096, filed on Mar. 13, 2006.

(51) Int. Cl.
 *B01J 23/10* (2006.01)
 *B01J 23/46* (2006.01)
 *H01M 4/36* (2006.01)

(52) U.S. Cl.
 USPC ............................ 502/304; 502/325; 429/483

(58) Field of Classification Search
 USPC .......................................................... 502/202
 See application file for complete search history.

(56) References Cited

U.S. PATENT DOCUMENTS

| | | | |
|---|---|---|---|
| 2,630,410 A * | 3/1953 | Clapsadle et al. | 516/86 |
| 3,347,630 A * | 10/1967 | Baumgartner et al. | 252/186.24 |
| 3,620,878 A | 11/1971 | Moore, Jr. | |
| 4,430,254 A | 2/1984 | Passariello | |
| 5,302,622 A * | 4/1994 | Chaumette et al. | 518/713 |
| 5,711,146 A * | 1/1998 | Armstrong et al. | 60/218 |
| 5,766,787 A | 6/1998 | Watanabe et al. | |
| 5,972,820 A | 10/1999 | Kharas et al. | |
| 6,335,112 B1 | 1/2002 | Asukabe et al. | |
| 6,743,267 B2 | 6/2004 | Jernakoff et al. | |
| 6,893,476 B2 | 5/2005 | Siddiqui et al. | |
| 7,022,255 B2 | 4/2006 | Siddiqui et al. | |
| 7,077,880 B2 * | 7/2006 | Siddiqui | 51/307 |
| 7,112,386 B2 | 9/2006 | Cipollini et al. | |
| 7,244,688 B2 | 7/2007 | Reetz et al. | |
| 2003/0008196 A1 | 1/2003 | Wessel et al. | |
| 2003/0118824 A1 * | 6/2003 | Tokarz et al. | 428/404 |
| 2004/0043283 A1 | 3/2004 | Cipollini et al. | |
| 2005/0026046 A1 | 2/2005 | Yan | |
| 2005/0136308 A1 | 6/2005 | Andrews et al. | |
| 2005/0155296 A1 * | 7/2005 | Siddiqui | 51/307 |
| 2005/0175525 A1 | 8/2005 | Fu et al. | |
| 2006/0019140 A1 | 1/2006 | Kawazoe et al. | |
| 2006/0117667 A1 | 6/2006 | Siddiqui et al. | |
| 2006/0255015 A1 | 11/2006 | Siddiqui | |
| 2007/0054495 A1 | 3/2007 | Compton et al. | |
| 2007/0099052 A1 | 5/2007 | Frey et al. | |
| 2007/0099053 A1 | 5/2007 | Frey et al. | |

FOREIGN PATENT DOCUMENTS

| | | |
|---|---|---|
| DE | 19946694 A1 | 6/2000 |
| EP | 0582165 B1 | 5/1997 |
| EP | 1271682 A2 | 1/2003 |
| EP | 1302522 A2 | 4/2003 |
| JP | 2005235437 A * | 9/2005 |
| WO | 03078056 A1 | 9/2003 |
| WO | 2005045953 A2 | 5/2005 |
| WO | 2005071779 A2 | 8/2005 |
| WO | 2007007767 A1 | 1/2007 |

OTHER PUBLICATIONS

Takeshita Tomohiro et al., Electrolyte Membrane Electrode Joint Body for Solid Polymer Type Fuel Cell and Solid Polymer Type Fuel Cell, Patent Abstracts of Japan, JP2005-235437, Sep. 2, 2005.
Endo Eiji et al., Electrolyte Film for Solid Polymer Fuel Cell, Manufacturing Method of the Same, and Film-Electrode Junction for Solid Polymer Fuel Cell, Patent Abstracts of Japan, JP2006-107914, Apr. 20, 2006.
Endo Eiji et al., Electrolyte Membrane for Solid Polymer Fuel Cell, Manufacturing Method Thereof, and Membrane Electrode Assembly for Solid Polymer Fuel Cell, Patent Abstracts of Japan, JP2006-260811, Sep. 28, 2006.
Motomura Satoru et al., Electrolyte Film for Polymer Electrolyte Fuel Cell, Manufacturing Method of Same, Membrane Electrode Assembly for Polymer Electrolyte Fuel Cell, and Operation Method of Same, Patent Abstracts of Japan, JP2006-302600, Nov. 2, 2006.
Morimoto Tomo et al., High Durability Solid Polymer Electrolyte, Patent Abstracts of Japan, JP2001-118591, Apr. 27, 2001.
U.S. Appl. No. 11/712,296, filed Feb. 28, 2007, Kimberly Gheysen Raiford et. al.

* cited by examiner

*Primary Examiner* — Melvin C Mayes
*Assistant Examiner* — Stefanie Cohen
(74) *Attorney, Agent, or Firm* — Andrew G. Bunn

(57) ABSTRACT

A catalytically active component is provided which comprises particles containing a metal oxide such as silica, metal or metalloid ions such as ions that include boron, and a catalyst. When introduced into the membrane electrode assembly of a fuel cell, the particles increase peroxide radical resistance in a membrane electrode.

9 Claims, No Drawings

PEROXIDE DECOMPOSITION CATALYST PARTICLES

FIELD OF THE INVENTION

The present invention relates to a catalytically active component capable of decomposing hydrogen peroxide in a fuel cell membrane electrode assembly, thereby providing a more stable proton exchange membrane and membrane electrode assembly.

BACKGROUND

Electrochemical cells generally include an anode electrode and a cathode electrode separated by an electrolyte, where a proton exchange membrane (hereafter "PEM") is used as the electrolyte. A metal catalyst and electrolyte mixture is generally used to form the anode and cathode electrodes. A well-known use of electrochemical cells is in a stack for a fuel cell (a cell that converts fuel and oxidants to electrical energy). In such a cell, a reactant or reducing fluid such as hydrogen or methanol is supplied to the anode, and an oxidant such as oxygen or air is supplied to the cathode. The reducing fluid electrochemically reacts at a surface of the anode to produce hydrogen ions and electrons. The electrons are conducted to an external load circuit and then returned to the cathode, while hydrogen ions transfer through the electrolyte to the cathode, where they react with the oxidant and electrons to produce water and release thermal energy.

Fuel cells are typically formed as stacks or assemblages of membrane electrode assemblies (MEAs), which each include a PEM, an anode electrode and cathode electrode, and other optional components. Fuel cell MEAs typically also comprise a porous electrically conductive sheet material that is in electrical contact with each of the electrodes and permits diffusion of the reactants to the electrodes, and is know as a gas diffusion layer, gas diffusion substrate or gas diffusion backing. When the electrocatalyst is coated on the PEM, the MEA is said to include a catalyst coated membrane (CCM). In other instances, where the electrocatalyst is coated on the gas diffusion layer, the MEA is said to include gas diffusion electrode(s) (GDE). The functional components of fuel cells are normally aligned in layers as follows: conductive plate/gas diffusion backing/anode electrode/membrane/cathode electrode/gas diffusion backing/conductive plate.

Long term stability of the PEM is critically important for fuels cells. For example, the lifetime goal for stationary fuel cell applications is 40,000 hours of operation. Typical membranes found in use throughout the art will degrade over time through decomposition and subsequent dissolution of the ion-exchange polymer in the membrane, thereby compromising membrane viability and performance. While not wishing to be bound by theory, it is believed that this degradation is a result, at least in part, of the reaction of the ion-exchange polymer of the membrane and/or the electrode with hydrogen peroxide ($H_2O_2$) radicals, which are generated during fuel cell operation. Fluoropolymer membranes are generally considered more stable in fuel cell operations than hydrocarbon membranes that do not contain fluorine, but even perfluorinated ion-exchange polymers degrade in use. The degradation of perfluorinated ion-exchange polymers is also believed to be a result of the reaction of the polymer with hydrogen peroxide.

Thus, it is desirable to develop a process for reducing or preventing degradation of a proton exchange membrane or membrane electrode assembly due to their interaction with hydrogen peroxide radicals, thereby sustaining performance while remaining stable and viable for longer periods of time, wherein as a result, fuel cell costs can be reduced.

SUMMARY OF THE INVENTION

The present invention relates to particles that are useful for increasing the hydrogen peroxide radical resistance in a membrane electrode assembly. The particles comprise a metal oxide from the group of alumina, titanium dioxide, zirconium oxide, germania, silica, ceria, and combinations thereof; a stabilizer from the group of metal ions and metalloid ions, and combinations thereof; and at least one catalyst different from the stabilizer and selected from the group of cerium and ruthenium. The preferred stabilizer is one or more metal or metalloid ions containing an element from the group of aluminum, boron, tungsten, titanium, zirconium and vanadium.

DETAILED DESCRIPTION

Where a range of numerical values is recited herein, unless otherwise stated, the range is intended to include the endpoints thereof, and all integers and fractions within the range. It is not intended that the scope of the invention be limited to the specific values recited when defining a range. Moreover, all ranges set forth herein are intended to include not only the particular ranges specifically described, but also any combination of values therein, including the minimum and maximum values recited.

The present invention is intended for use in conjunction with fuel cells utilizing proton-exchange membranes. Examples include hydrogen fuel cells, reformed-hydrogen fuel cells, direct methanol fuel cells or other organic feed fuel cells such as those utilizing feed fuels of ethanol, propanol, dimethyl- or diethyl ethers, formic acid, carboxylic acid systems such as acetic acid, and the like.

As used herein, "catalytically active component" shall mean a component having the ability to serve as a hydrogen peroxide scavenger to protect the PEM from chemical reaction with hydrogen peroxide by decomposing hydrogen peroxide to $2H_2O$ and $O_2$. As noted above, and while not wishing to be bound by theory, it is believed that degradation of PEMs is a result of the reaction of the membrane polymer with hydrogen peroxide radicals, which are generated during fuel cell operation.

Typical perfluorosulfonic acid ion-exchange membranes found in use throughout the art will degrade over time through decomposition and subsequent dissolution of the fluoropolymer, thereby compromising membrane viability and performance. However, the present invention provides for a membrane having a long term stability, targeting durability goals of up to about 8000 hours in automotive fuel cell applications and up to about 40,000 hours for stationary fuel cell applications.

Catalytically Active Component

In general, the catalytically active components of the present invention may be delivered to the interior of the ion exchange membrane, the anode electrode, the cathode electrode, or the surface of a gas diffusion backing (anode or cathode sides). The catalytically active components may additionally or alternatively be provided to other locations such as to the surface of the ion exchange membrane or the electrodes. A significant advantage of the catalytically active components of the invention is that the component can be incorporated into a PEM or MEA without the need for subsequent treatment steps such as chemical reduction or hydrolysis treatment of a precursor to the catalytically active component, which is the case with many known catalytically active components.

The catalytically active component used for treating a PEM or MEA comprise colloidal or fumed metal oxide particles such as alumina, silica, ceria ($CeO_2$), $Ce_2O_3$, titania ($TiO_2$), $Ti_2O_3$, zirconium oxide, manganese dioxide, yttrium oxide ($Y_2O_3$), $Fe_2O_3$, FeO, tin oxide, germania, copper oxide, nickel oxide, manganese oxide, tungsten oxide, and mixtures thereof. Preferred particles are colloidal particles including, but are not limited to, colloidal silica, colloidal ceria, and colloidal titanium dioxide, with colloidal silica being most preferred. These metal oxide particles may be produced by any technique known to those skilled in the art.

In preferred embodiments, the metal oxide consists of metal oxide aggregates and colloid particles having a size distribution with a maximum colloid particle size less than about 1.0 micron, and a mean colloid particle diameter less than about 0.4 micron and a force sufficient to repel and overcome the van der Waals forces between particle aggregates and/or individual particles. The particle size distribution in the present invention may be determined utilizing known techniques such as transmission electron microscopy (TEM). The mean particle diameter refers to the average equivalent spherical diameter when using TEM image analysis, i.e., based on the cross-sectional area of the particles. By "force" is meant that either the surface potential or the hydration force of the metal oxide particles must be sufficient to repel and overcome the van der Waals attractive forces between the particles. A spherical or approximately spherical particle is preferred in this invention.

In a preferred embodiment, the metal oxide colloid particles may consist of discrete, individual metal oxide colloid particles having mean particle diameters from 2 nanometers to 200 nanometers, and more preferably from 5 nanometers to 100 nanometers, and most preferably from 5 to 50 nanometers.

The catalytically active component further comprises at least one stabilizer. As used herein, the term "stabilizer" means an agent effective to help maintain the particles as a sol in an aqueous medium. Suitable stabilizers include metals and borderline metals or metaloids, from the group of boron, tungsten, aluminum, titanium, zirconium and vanadium and combinations thereof. Preferably, the stabilizer comprises metal ions or metalloid ions containing aluminum, boron, tungsten, titanium, zirconium, or vanadium, with boron containing ions being most preferred.

The catalytically active component further comprise at least one catalyst. As used herein, the term "catalyst" means an agent effective to catalyze a reaction that decomposes $H_2O_2$. Preferred catalysts possess multiple oxidation states, and are from the group of cerium, platinum, palladium, lanthanum, yttrium, gadolinium, silver, iron, ruthenium, titanium, vanadium, and combinations thereof. The catalysts may be present as metals, metal salts or metal oxides. Ruthenium and cerium are the most preferred catalysts. The at least one stabilizer and the at least one catalyst should not simultaneously be the same element.

In particularly preferred embodiments, the inventive composition comprises bimetallic surface-modified colloidal particles containing as the two metals on the surface of the particles boron and ruthenium, or boron and cerium. It should be apparent from the foregoing that the terms "metal" and "bimetallic" as used herein in the context of surface modification are intended to encompass borderline metals or metalloids, such as boron, as well as more prototypical metals. Other combinations of metals are also possible, as are combinations of metals and non-metals.

It is preferred that at least 10%, more preferably 40-95%, even more preferably 80-95% of available surface sites on the colloidal particles be occupied by the stabilizer and/or the catalyst. The percentage of surface sites covered on the particles in a composition of this invention can range up to 100%.

The molar ratio of catalyst to stabilizer can vary depending upon the composition of the colloidal particle. Similarly, the molar ratio of catalyst to colloidal metal oxide can also vary depending upon conditions and desired results. For example, the molar ratio of catalyst to stabilizer preferably ranges from 1:1 to 1:10 and the molar ratio of catalyst to metal oxide preferably ranges from 1:1 to 1:10. In certain embodiments, the molar ratio of stabilizer to colloidal metal oxide particle ranges from 10:1 to 1:10.

Typically, the stabilizer comprises from about 0.1 wt-% to about 20 wt-% of the catalytically active component, preferably from about 0.5 wt-% to about 15 wt-% and more preferably from about 0.8 wt-% to about 7 wt-% of the catalytically active component.

Typically, the catalyst comprises from about 0.05 wt-% to about 40 wt-% of the catalytically active component, preferably from about 0.1 wt-% to about 20 wt-% and more preferably from about 0.3 wt-% to about 10 wt-% of the catalytically active component.

The amount of surface-modification of the metal oxide particle with stabilizer depends upon the average size of the particles. Colloidal particles that are smaller and which consequently have higher surface area generally require higher relative amounts of stabilizer than do larger particles, which have lower surface area. As a non-limiting illustrative example, for boric acid surface-modified colloidal silica, the various sizes of colloidal particles require the approximate levels of boric acid modification as shown in the table below, in order to achieve good stability towards gel formation in acidic media, such as an ion-exchange polymer in proton form.

| Mean Particle Diameter (Nanometers, nm) | Relative Amount of Boric Acid to Silica (R, unitless) | % Modification if Silica Surface* |
|---|---|---|
| 12 | 8.0 | 92 |
| 23 | 6.0 | 95 |
| 50 | 4.3 | 98 |
| 100 | 2.0 | 99 |

R = 100 × (moles of boric acid)/(moles of silica)
*Approximate values

The surface coverage of the surface modified metal oxide particles can be characterized using zeta potential measurement. For example, the amount of surface coverage of boric acid on the silica surface can be measured using a Colloidal Dynamics instrument, manufactured by Colloidal Dynamics Corporation, Warwick, R.I. The Colloidal Dynamics instrument measures the zeta potential (surface charge) of surface modified particles. During the preparation of boric acid modified silica, boric acid is added to the deionized silica particles, which changes the zeta potential of the silica particle surface. After reaching full surface coverage, there is no further change in the zeta potential of the surface modified silica. From a titration curve of zeta potential as a function of grams of boric acid to a given amount of silica, it is possible to determine the percent surface coverage of boric acid on the silica surface. After completing the reaction with boric acid, the surface coverage achieved by reacting the boron-modified sol with the second metal salt can also be determined from the zeta potential in the same way.

It is also possible to provide surface-modified metal oxide particles containing more than two different agents bonded to their surfaces. Thus, multi-metallic surface-modified particles containing more than two different metals or metalloids on their surface are also within the scope of the invention, as are combinations of at least two different metals, metalloids and other organic agents such as chelating agents or complexing agents.

The multi-metallic surface modified particles described above can be prepared by reacting de-ionized metal oxide particles such as alumina, titanium dioxide, zirconium oxide, germania, silica, ceria and mixtures thereof in an aqueous dispersion with a stabilizer in solution such as solutions of boric acid, aluminum acetate, tungstic acid, or zirconium acetate. In a preferred embodiment, de-ionized colloidal silica particles in an aqueous dispersion are reacted at about 60° C. with a boric acid solution having a pH of about 2. The stabilized particles may be subsequently reacted with a catalyst metal salt solution or a mixture of catalyst metal salts at ambient temperature to obtain multi-metal surface modified particles. Examples of suitable catalyst metal salts include platinum chloride, ruthenium nitrosyl nitrate and ceria acetate. The multi-metal surface modified particles can also be treated with a chelating agent or complexing agent followed by reaction with additional metal salts.

The chemical structure of one ruthenium and boron modified silica particle useful in the invention is shown as structure (I) below.

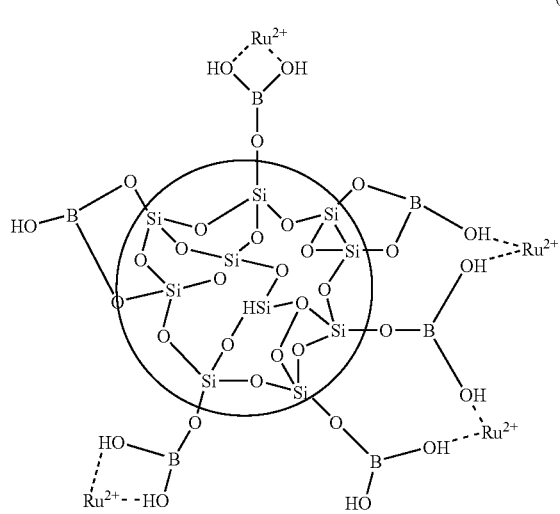

The chemical structure of one ceria and boron modified silica particle useful in the invention is shown as structure (II) below.

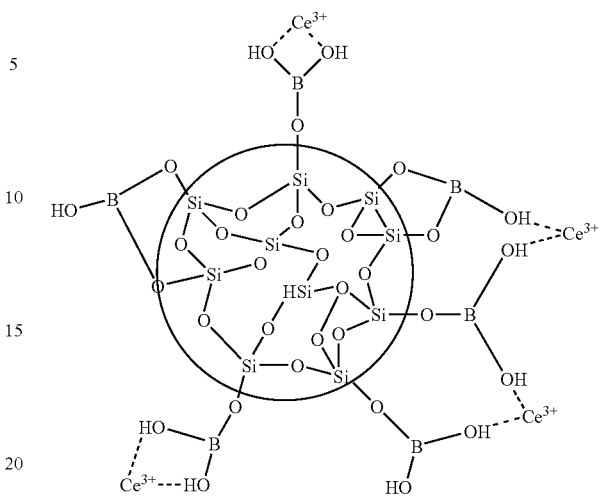

The catalytically active component may be homogenously or non-homogeneously dispersed within the ion-exchange polymer of the membrane or electrodes of a membrane electrode assembly. The catalytically active component may be further homogeneously or non-homogeneously dispersed, surface coated or deposited on the surface of the ion exchange membrane, the anode electrode, the cathode electrode, or the gas diffusion backing.

The amount of catalytically active component utilized is dependent upon the method in which it is employed, for example, whether it is dispersed within the membrane or the electrodes, or applied onto the surface of the membrane, the electrodes or the gas diffusion backing.

The catalytically active component can be added directly to the proton exchange membranes by several processes known in the art such as, for example, direct imbibing of a PEM or by casting or melt extruding PEMs with the catalytically active component precursors incorporated in the ionomer. Typically, the catalytically active components of the present invention comprise from about 1 wt-% to about 20 wt-% of the total weight of the membrane, and preferably from about 2 wt-% to about 10 wt-% and more preferably from about 3 wt-% to about 8 wt-% of the membrane.

A preferred process for incorporating the catalytically active component into a PEM is by solution casting of the membrane. In this process, the catalytically active component particles are mixed with the ionomer and an organic solvent or a mixture of organic solvents or water. It is advantageous for the solvent to have a sufficiently low boiling point that rapid drying is possible under the process conditions employed. When flammable constituents are to be employed, the solvent can be selected to minimize process risks associated with such constituents. The solvent also must be sufficiently stable in the presence of the ion-exchange polymer, which has strong acidic activity in the acid form. The solvent typically includes polar components for compatibility with the ion-exchange polymer. A variety of alcohols are well suited for use as the organic solvent, including C1 to C8 alkyl alcohols such as methanol, ethanol, 1-propanol, iso-propanol, n-, iso-, sec- and tert-butyl alcohols; the isomeric 5-carbon alcohols such as 1,2- and 3-pentanol, 2-methyl-1-butanol, 3-methyl, 1-butanol, etc.; the isomeric 6-carbon alcohols, such as 1-, 2-, and 3-hexanol, 2-methyl-1-pentanol, 3-methyl-1-pentanol, 2-methyl-1-pentanol, 3-methyl, 1-pentanol, 4-methyl-1-pentanol, etc.; the isomeric. C7 alcohols and the isomeric C8 alcohols. Cyclic alcohols are also suitable. Preferred alcohols are n-butanol and n-hexanol. The organic solvent may also include glycols to be used alone or in combination with alcohols.

The mixture of catalytically active component, ionomer and solvent is cast onto a carrier substrate, dried to remove the solvents and then heated at higher temperatures to coalesce the membrane. The membrane may be solution cast in a variety of forms, including single layer films, multiple layer films, or films incorporating a reinforcing substrate or reinforcing fibers. In multiple layer films, the catalytically active component particles can be selectively included in particular layers. In a reinforced solution cast membrane, the catalytically active component can be incorporated on one side of the reinforcement, on both sides of the reinforcement or throughout the entire membrane. Alternatively, where the membrane is cast in layers, the catalytically active component may be selectively applied as a thin layer of catalytically active component in ionomer between one or more layers of the membrane. In addition, different catalytically active component particles can be added to different layers of solution cast membranes.

In order to imbibe a PEM with catalytically active component, a PEM can be soaked in a solution of the catalytically active component in water, alcohol or a mixture thereof. The membrane is typically soaked in the solution for 30 minutes to several hours. After soaking, the membrane is removed from the solution and dried so as to leave the catalytically active component in the membrane.

The catalytically active components described above can be applied to the surface of a membrane prior to the application of an electrocatalyst; applied to the surface of the membrane as part of an electrocatalyst layer; or applied to the surface of the electrodes or gas diffusion backing using methods known within the art for the application of such coatings. When the catalytically active component is applied to the surface of the membrane, electrodes or gas diffusion backing (GDB), the catalytically active component is mixed with ionomer and a solvent for application to the desired surface. The surface layer containing the catalytically active component and ionomer typically has a thickness of less than about 10 microns, and preferably from about 0.01 to about 5 microns, and more preferably from about 0.5 to about 3 microns.

Ink printing technology can be used for the application of the mixture of catalytically active component, ionomer and solvent to a membrane or electrode surface. Alternatively, a decal transfer process can be used wherein the mixture of catalytically active component, ionomer and solvent is applied to a release film and dried to form a decal. The exposed surface of the decal is subsequently placed against a membrane or electrode surface and subjected to hot pressing to fix the decal to the surface before the release film is removed. Other application and coating techniques known within the art can also be used, such as spraying, painting, patch coating, screen printing, pad printing or flexographic printing.

Typically, a liquid medium or carrier is utilized to deliver a surface coating of catalytically active component and ionomer to the membrane, electrodes or GDB. Generally, the liquid medium is also compatible with the process for creating a gas diffusion electrode (GDE) or catalyst coated membrane (CCM), or for coating the cathode and anode electrocatalyst onto the membrane or GDB. It is advantageous for the liquid medium to have a sufficiently low boiling point that rapid drying is possible under the process conditions employed, provided however, that the medium does not dry so fast that the medium dries before transfer to the membrane or electrode surface. The medium also must be sufficiently stable in the presence of the ion-exchange polymer, which may have strong acidic activity in the acid form. The liquid medium typically includes polar components for compatibility with the ion-exchange polymer, and is preferably able to wet the membrane. Polar organic liquids or mixtures thereof, such as the alcohols and alcohol/water mixtures discussed in the solution casting section above, are typically used. Water can be present in the medium if it does not interfere with the coating process. Although some polar organic liquids can swell the membrane when present in sufficiently large quantity, the amount of liquid used is preferably small enough that the adverse effects from swelling during the coating process are minor or undetectable.

The catalytically active component can be applied in a number of ways to the gas diffusion backing of a membrane electrode assembly. The gas diffusion backing comprises a porous, conductive sheet material in the form of a carbon paper, cloth or composite structure, which can optionally be treated to exhibit hydrophilic or hydrophobic behavior, and coated on one or both surfaces with a gas diffusion layer, typically comprising a layer of particles and a binder, for example, fluoropolymers such as PTFE. Where the catalytically active component is directly applied to the gas diffusion backing, an appropriate application method can be used, such as spraying, dipping or coating. The catalytically active component can also be incorporated in a "carbon ink" (carbon black and electrolyte) that may be used to pretreat the surface of the GDB that contacts the electrode surface of the membrane. The catalytically active component can also be added to the PTFE dispersion that is frequently applied to the GDB to impart hydrophobicity to the GDB.

Where the catalytically active component is applied to the surface of the PEM by adding it to the anode or cathode electrocatalyst electrode layers of the membrane electrode assembly, the catalytically active component comprises from about 0.5 wt-% to about 10 wt-% of the total weight of the electrode, and more preferably from about 1 wt-% to about 8 wt-% of the total weight of the electrode. Such electrode layers may be applied directly to the ion exchange membrane, or alternatively, applied to a gas diffusion backing, thereby forming a catalyst coated membrane (CCM) or gas diffusion electrode (GDE), respectively. A variety of techniques are known for CCM manufacture. Typical methods for applying the electrode layers onto the gas diffusion backing or membrane include spraying, painting, patch coating and screen, decal, pad printing or flexographic printing. Such coating techniques can be used to produce a wide variety of applied layers of essentially any thickness ranging from very thick, e.g., 30 µm or more, to very thin, e.g., 1 µm or less. The applied layer thickness is dependent upon compositional factors as well as the process utilized to generate the layer.

The embodiments of the present invention are further illustrated in the following Examples. From the above discussion and these Examples, one skilled in the art can ascertain the essential characteristics of this invention, and without departing from the spirit and scope thereof, can make various changes and modifications of the invention to adapt it to various uses and conditions. Thus various modifications of the present invention in addition to those shown and described herein will be apparent to those skilled in the art from the foregoing description. Although the invention has been described with reference to particular means, materials and embodiments, it is to be understood that the invention is not limited to the particulars disclosed, and extends to all equivalents within the scope of the claims.

EXAMPLES

The examples are directed to the preparation of metal-modified colloidal silica and its use with perfluorinated membranes of fuel cell MEAs. Select bimetallic surface coated colloidal silica particles were prepared and used to treat proton exchange membranes suitable for use in MEAs. Sample membranes were tested for oxidative stability according to a hydrogen peroxide stability test.

In the hydrogen peroxide stability test, the decomposition of various membranes due to the action of $H_2O_2$ on the membrane in the presence of Fe2+ catalyst was measured. The decomposition of the membrane was determined by measuring the amount of hydrogen fluoride that is released from the membrane during a reaction with hydrogen peroxide radicals.

Part A of the examples describes the preparation of bimetallic surface coated silica colloidal particles. Part B describes the preparation and properties of PEMs imbibed with the bimetallic modified silica of Part A. Part C describes the preparation and properties of solution cast PEMs with bimetallic modified silica of Part A incorporated therein.

Part A: Preparation of metal-boron oxide modified silica in two steps. Step 1 is directed to the preparation of boron modified silica, and Step 2 is directed to the immobilization of different catalyst metal ions on the boron modified silica.

Step 1: Preparation of Boron-Modified Silica. The procedure used for the preparation of boron-coated silica was as described in U.S. Pat. No. 6,743,267 directed to surface modified colloidal abrasives. Approximately 1 kg of AMBERLITE IR-120, a strongly acidic cationic exchange resin (Rohm and Haas Company, Philadelphia, Pa.), was washed with 1 liter of 20% sulfuric acid solution. The mixture was stirred and the resin was allowed to settle. The aqueous layer was decanted and washed with 10 liters of deionized water. The mixture was again allowed to settle and then the aqueous layer was decanted. This procedure was repeated until the decanted water was colorless. This procedure afforded an acidic form of resin.

12 kg (approximately 2.27 gallons) of SYTON™ HT 50, a 50 nanometer mean particle size colloidal silica in the sodium form (DuPont Air Products NanoMaterials L.L.C., Tempe, Ariz.) was placed in a five-gallon mix tank equipped with an agitator. 2.502 kg of de-ionized water was added to the tank and the solution was allowed to mix for a few minutes. The pH of the solution was measured to be approximately 10.2. With continued pH monitoring, small amounts of the acid-state ion-exchange resin were added, while allowing the pH to stabilize in between additions. Additional resin was added in small portions until the pH had dropped to pH 1.90-2.20. Once this pH limit had been reached and was stable in this range, no further ion-exchange resin additions were made and the mixture was stirred for 1-1.5 hours. Subsequently, the mixture was passed through a 500-mesh screen to remove the ion-exchange resin and afforded de-ionized SYTON HT 50 colloidal silica.

A solution of 268 g of boric acid powder (Fisher Scientific, 2000 Park Lane, Pittsburgh, Pa.) in 5.55 kg of de-ionized water was prepared in a 10 gallon mixing tank equipped with an agitator and a heater by slowly adding the boric acid powder until all had been added to the water and then agitating the mixture for 5 minutes and increasing the temperature of the mixture to 55-65° C. De-ionized and diluted SYTON HT 50 (14.5 kg) was then added to the boric acid solution slowly over about 1.2 hours by adding it at approximately 200 ml/minute and maintaining the temperature greater than 52° C. while agitating the mixture. After this addition was completed, heating at 60° C. and agitation of the mixture were continued for 5.5 hours. The resulting solution was subsequently filtered through a 1-micron filter to afford an aqueous dispersion of boron surface-modified colloidal silica, with about 30% solids.

This boron surface-modified colloidal silica was characterized for colloid stability over 15 days using a Colloidal Dynamics instrument (Warwick, R.I.), and was found to exhibit both constant pH (pH approximately 6.6) and zeta potential (zeta potential of approximately 58 millivolts) over the 15-day test period. The percentage of surface sites of this surface-modified colloidal silica occupied by boron-containing compound(s) was calculated to be approximately 98%. The molar ratio of boric acid to silica was 4.3.

Step 2: Immobilization of Catalyst Metal Ions on the Boron-Modified Silica. For each example, 170 grams of deionized water was added to a 250 ml beaker, and was kept under agitation using a magnetic stirrer. To the de-ionized water, 80 grams of the aqueous dispersion of boric acid modified silica, 30% solids was added slowly, and mixed for an additional 10 minutes. For examples 1 and 2, ruthenium nitrosylnitrate was added to one of the beakers under agitation to form a dispersion of bimetallic surface-modified silica. Each dispersion was agitated for an additional 15 minutes. The pH of each dispersion was measured, and is reported in Table 1. Table 1 also summarizes the amounts of the components of each dispersion.

TABLE 1

| Sample | Ex. 1 | Ex. 2 | Comp Ex. A |
|---|---|---|---|
| D.I. Water (grams) | 170 | 170 | 170 |
| Metal Salt | Ruthenium nitrosylnitrate | Ruthenium nitrosylnitrate | — |
| Amount of metal salt | 2.8 g in 1.5% solution | 14.0 g in 1.5% solution | — |
| Boric acid modified silica, 50 nm 30% solids (grams) | 80 | 80 | 80 |
| Molar ratio of metal to boron-coated silica, % | 0.1 | 0.5 | — |
| pH | 2.0 | 1.5 | 6.3 |

Additional dispersions were prepared using a boron-coated colloidal silica made by the process describe in Step 1 above except that 12 nanometer mean particle size colloidal silica particles (Syton HS-40, DuPont Air Products NanoMaterials L.L.C., Tempe, Ariz.) were used in place of the 50 nanometer colloidal silica particles. On the 12 nm colloidal silica particles, the surface coverage of boric acid was approximately 46%. The molar ratio of boric acid to silica was about 4.0.

To a 250 ml beaker, 110 grams of an aqueous dispersion of the metal-modified silica, 18.15 wt % solids, was added and was kept under agitation using a magnetic stirrer. For each example, to the boron-modified silica, the amount of deionized water specified in Table 2 was added slowly, and mixed for an additional 10 minutes. Under agitation, the metal salt specified in Table 2 for Examples 3 and 4, respectively, was added slowly. Each dispersion was agitated for additional 15 minutes. The pH was measured, and it is reported in Table 2. Table 2 also summarizes the amounts of the components of each dispersion.

TABLE 2

| Sample | Ex. 3 | Ex. 4 |
|---|---|---|
| DI Water (grams) | 54.6 | 55.3 |
| Metal Salt | Ceria acetate | Ruthenium nitrosylnitrate |
| Amount of metal salt | 35.4 g in 5% solution | 34.7 g in 1.5% solution |
| Boric acid modified 12 nm silica, 18.15% solids (grams) | 110 | 110 |
| Molar ratio of metal to boron-coated silica, % | 0.5 | 0.5 |
| pH | 3.6 | 1.15 |

Part B: Imbibed Membranes.

Membranes containing bimetallic-modified silica particles were prepared for testing as follows. To a 25 mm×200 mm test tube was added a 1.0 g piece of dried (1 hour at 90° C. in Vac oven) Nafion® N117 proton exchange membrane in the proton form and an EW of about 1050 (obtained from DuPont, Wilmington, Del.) and having a thickness of about 7 mil and an area of about 28 $cm^2$. To this was added 25 mL of de-ionized water and the amount of the bimetallic-modified silica particle dispersion indicated below for each example in order to incorporate approximately 5-6 wt % of the particle additive into the Nafion® membranes. A stir bar was placed on top of the membrane to keep the membrane immersed in the solution. The sample tube was slowly immersed in a hot water bath (85° C.) and held for 30 minutes. This process was repeated for each of the Examples 1-4 and Comparative Example A.

Ex. 1

Ruthenium Nitrosylnitrate Modified Boron Coated Silica (0.1% Molar Ratio), 0.5 g Ex. 2

Ruthenium Nitrosylnitrate Modified Boron Coated Silica (0.5% Molar Ratio), 0.5 g Ex. 3

Ceria Acetate Modified Boron Coated Silica, 0.5 g

Ex. 4

Ruthenium Nitrosyl Nitrate Modified Boron Coated Silica, 0.5 g

Comparative Ex. a Boric Acid Modified Silica Control, 0.2 g

Each membrane was tested for oxidative stability using the following hydrogen peroxide stability test. After removing the test tube from the hot water bath and cooling to room temperature, a solution of 25 mL of 30% hydrogen peroxide and iron sulfate ($FeSO_4*7H_2O$)(0.005 g) was added to the test tube holding water and the membrane imbibed with the bimetallic modified silica particles. Each test tube was then slowly immersed in a hot water bath (85° C.) and heated for 18 hours. Each sample was removed and when cooled, the liquid was decanted from the test tube into a tared 400 mL beaker. The tube and membrane were rinsed with 250 mL of de-ionized water, and the rinses were placed in the 400 mL beaker. Two drops of phenolphthalein were added, and the content of the beaker was titrated with 0.1N NaOH until the solution turned pink. The beaker was weighed. A mixture of 10 mL of the titrated solution and 10 mL of sodium acetate buffer solution was diluted with de-ionized water to 25 mL in a volumetric flask. The conductivity of this buffered solution was measured using a fluoride ion selective electrode and the concentration of fluoride (in ppm) was determined from the measured conductivity using a previously generated "concentration" vs. "conductivity" calibration curve. The membrane imbibed with the bimetallic modified silica particles was allowed to air-dry and then was oven-dried (1 hour at 90° C. in Vac oven) and weighed immediately. A percent weight loss was calculated from the dry membrane weights.

The fluoride emission data for Examples 1 and 2 and Comparative Example A are shown in Table 3 below.

TABLE 3

| Membrane | Fluoride Emission (mg fluoride/g) |
|---|---|
| Control (no membrane) | 5.37 |
| Example 1 | 2.19 |
| Example 2 | 1.30 |
| Comparative Example A | 4.81 |

The fluoride emission data for a second control and for Examples 3 and 4, which were all tested separately under the same conditions as above, but with piece of Nafion® membrane from a different lot, are shown in Table 4 below.

TABLE 4

| Membrane | Fluoride Emission (mg fluoride/g) |
|---|---|
| Control (no membrane) | 3.84 |
| Example 3 | 0.78 |
| Example 4 | 0.12 |

In the above examples, the metal modified boron coated silica particles protected the PEM against attack of hydrogen peroxide radicals as demonstrated by lower emission of fluoride ions. Boron coated silica particles modified with ruthenium and cerium were effective in these experiments. Moreover, metal modified boron coated silica particles having a smaller particle size of 12 nm (Examples 3 and 4) were more effective at reducing fluoride emission than larger particles of 50 nm.

Part C: Solution Cast Membranes.

Solution cast perfluorosulfonic acid membranes containing different amounts of ruthenium modified boron-coated silica particles of Example 1 were prepared according to the following procedure and tested according to the hydrogen peroxide stability test.

To a 100 mL beaker, 50.4 grams of a 11.9 weight percent dispersion of Nafion® perfluorosulfonic acid polymer in 1-butanol was added and stirred with a magnetic stir bar. The perfluorosulfonic acid polymer resin was in the sulfonic acid form and had an 886 EW measured by FTIR analysis of the sulfonyl fluoride form of the resin. To this mixture was added 0.6 grams of ruthenium modified boron coated silica particles of Example 5, and the mixture was stirred for 30 minutes. The weight ratio of bi-metallic silica particle solids to Nafion® polymer solids in this dispersion was 0.01. A membrane was solution cast from the dispersion onto 5 mil Mylar® A film (Tekra Corporation, New Berlin, Wis.) using a stainless steel knife blade and was air-dried. The membrane was subsequently oven-dried at 120° C. for 20 minutes, removed from the Mylar® film and then annealed at 160° C. for 3 minutes. This same procedure for preparing solution cast membranes containing the same bimetallic-modified silica particles was repeated using the amounts in Table 5 below to prepare membranes with modified silica to Nafion® polymer weight ratios of 0.05 and 0.10.

The solution cast membranes were tested according to the hydrogen peroxide stability test procedure used in Examples 1-8, except that each membrane sample was tested three times using fresh hydrogen peroxide and iron (II) sulfate reagents each time. The cumulative fluoride emission for three testing cycles are reported in Table 5 below.

TABLE 5

|  | Comp. Ex. B | Example 5 | Example 6 | Example 7 |
|---|---|---|---|---|
| Ruthenium modified boron-coated silica, 10% solids (grams) | 0 | 0.6 | 3.0 | 6.0 |
| Nafion ® dispersion in 1-butanol, 11.9% solids (grams) | 50.4 | 50.4 | 50.4 | 50.4 |
| Weight ratio of coated silica to Nafion ® polymer solids | 0 | 0.01 | 0.05 | 0.10 |
| Fluoride emission (mg fluoride/g) | 3.23 | 3.23 | 1.62 | 0.67 |

Additional solution cast perfluorosulfonic acid membranes containing different amounts of the ceria modified boron-coated silica particles of Example 3 and the ruthenium modified boron-coated silica particles of Example 4 were prepared and tested according to the procedure of Examples 5-7 and Comparative Example B.

To a 100 mL beaker, the amount of a 11.9 weight percent dispersion of Nafion® perfluorosulfonic acid polymer in 1-butanol in Table 6 was added and stirred with a magnetic stir bar. The perfluorosulfonic acid polymer resin was in the sulfonic acid form and had a 920 EW measured by FTIR analysis of the sulfonyl fluoride form of the resin. To this mixture was added ceria modified boron-coated silica particles of Example 3 (Examples 8 and 9) or the ruthenium modified boron-coated silica particles of Example 4 (Examples 10 and 11) and the mixture was stirred for 30 minutes. The amounts of the metal modified boron-coated silica particles and the weight ratio of modified silica particle solids to Nafion® polymer solids in this dispersion is reported in Table 6 below.

Membranes were cast from the dispersions onto 5 mil Mylar® A film (Tekra Corporation, New Berlin, Wis.) using a stainless steel knife blade and air-dried. The membranes were oven-dried at 120° C. for 20 minutes, removed from the Mylar® film and then annealed at 160° C. for 3 minutes. This procedure for preparing solution cast membranes containing bimetallic-modified silica particles was repeated for Examples 8-11 using the component amounts in Table 6 to prepare membranes.

The solution cast membranes were tested according to the hydrogen peroxide stability test procedure used in Examples 1-4, except that each membrane sample was tested three times using fresh hydrogen peroxide and iron (II) sulfate reagents each time. The cumulative fluoride emission for three testing cycles are reported in Table 6 below.

TABLE 6

|  | Comp. Ex. C | Example 8 | Example 9 | Example 10 | Example 11 |
|---|---|---|---|---|---|
| Metal modified boron-coated silica | None | ceria modified boron-coated silica of Ex. 3 | ceria modified boron-coated silica of Ex. 3 | Ru modified boron-coated silica of Ex. 4 | Ru modified boron-coated silica of Ex. 4 |
| Metal modified boron-coated silica, 10% solids (grams) | 0 | 3.0 | 4.4 | 3.0 | 4.4 |
| Nafion ® dispersion in 1-butanol, 11.9% solids (grams) | 50 | 45.6 | 44.4 | 45.6 | 44.4 |
| Ethylene glycol (grams) | 4.8 | 3.0 | 4.2 | 3.0 | 4.2 |
| Weight ratio of coated silica to Nafion ® polymer solids | — | 0.055 | 0.083 | 0.055 | 0.083 |
| Fluoride emission (mg fluoride/g) | 6.08 | 0.82 | 0.60 | 0.20 | 0.11 |

What is claimed is:

1. A fuel cell comprising particles for increasing the hydrogen peroxide radical resistance, said particles comprising:
   a metal oxide comprising colloid particles selected from the group consisting of alumina, silica, $TiO_2$, $Ti_2O_3$, zirconium oxide, manganese dioxide, manganese oxide, $Y_2O_3$, $Fe_2O_3$, FeO, tin oxide, copper oxide, nickel oxide, tungsten oxide, germania, $CeO_2$, $Ce_2O_3$, and combinations thereof,
   a stabilizer selected from the group consisting of metal ions and metalloid ions, and combinations thereof, and
   at least one catalyst different from the stabilizer and selected from the group consisting of cerium metal, cerium ions, ruthenium metal, and ruthenium ions; wherein the stabilizer metal ions or metalloid ions and catalyst metal or metal ions have been reacted onto the metal oxide particles to obtain multi-metal surface-modified particles.

2. The fuel cell of claim 1 wherein the stabilizer is one or more ions containing an element selected from the group consisting of aluminum, boron, tungsten, titanium, zirconium and vanadium.

3. The fuel cell of claim 1 wherein the colloidal particles have a mean particle diameter of less than 200 nanometers.

4. The fuel cell of claim 3 wherein the colloidal particles contain silica.

5. The fuel cell of claim 3 wherein the metal and metalloid ions include boron ions.

6. The fuel cell of claim 1 wherein the colloidal particles have a mean particle diameter of less than 100 nanometers.

7. The fuel cell of claim 6 wherein the colloidal particles contain silica and boron ions.

8. The fuel cell of claim 1 wherein the colloidal particles have a mean particle diameter of less than 25 nanometers.

9. The fuel cell of claim 8 wherein the colloidal particles contain silica and boron ions.

* * * * *